G. E. BURTSCHER.
HOSE SHIELD.
APPLICATION FILED NOV. 11, 1907.

921,079.

Patented May 11, 1909.

Witnesses:
A. A. Olson
H. S. Austin

Inventor:
George E. Burtscher,
by Joshua R. H. Potts,
Atty.

UNITED STATES PATENT OFFICE.

GEORGE E. BURTSCHER, OF CHICAGO, ILLINOIS.

HOSE-SHIELD.

No. 921,079.  Specification of Letters Patent.  Patented May 11, 1909.

Application filed November 11, 1907. Serial No. 401,582.

*To all whom it may concern:*

Be it known that I, GEORGE E. BURTSCHER, a citizen of the United States, residing at Chicago, county of Cook, and State of Illinois, have invented certain new and useful Improvements in Hose-Shields, of which the following is a specification.

My invention relates to hose couplings and particularly to devices adapted to hold the end of the hose and its coupling more firmly together and termed a hose shield.

A metallic hose coupling for flexible hose consists generally in a threaded nipple having a shank or sleeve to be inserted in the end of the hose and generally having a collar to limit the movement of the sleeve into the hose. After the sleeve has been inserted in the end of the hose a wire is clamped about the end to prevent separation of the hose and coupling. Such a coupling has been found inadequate in practice especially when the hose is used for fluid under great pressure. As under such circumstances the coupling is blown out by tearing the hose or the hose is cut by the binding wire. I am aware that devices have been devised to avoid this but usually they are quite expensive and generally necessitate an abandonment of the old coupling to be replaced by a coupling of an entirely different and more expensive style.

The object of my invention is to provide a simple and effective hose shield which shall be of low cost to manufacture and which is adapted to be used with the ordinary hose coupling to prevent them from blowing out or tearing loose from the hose.

Other objects will appear hereinafter.

Figure 1:
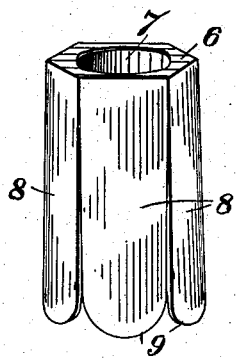
Figure 2:
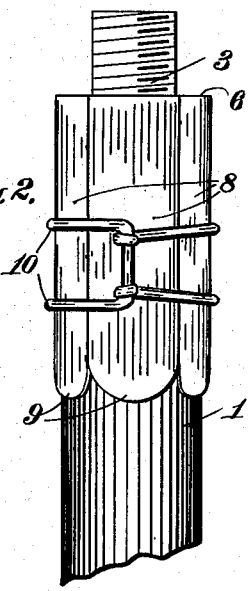
Figure 6:
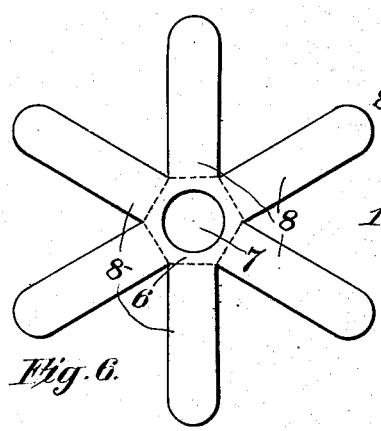
Figure 3:
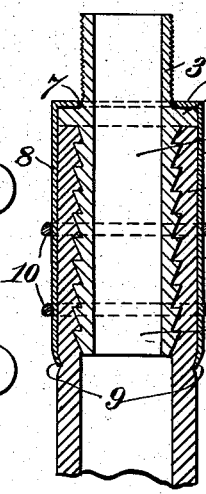
Figure 4:
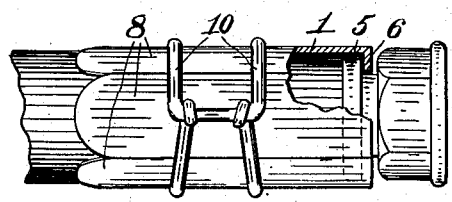
Figure 5:
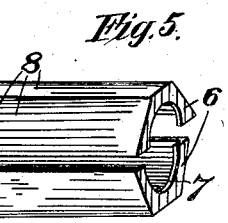

My invention will be more readily understood by reference to the accompanying drawings forming a part of this specification and in which, Figure 1 is a perspective view of a hose shield embodying my invention in its preferred form, Fig. 2 is an elevation of the end of a hose and hose coupling equipped with my novel hose shield, Fig. 3 is a longitudinal section thereof, Fig. 4 is an elevation of a hose coupling such as is used to connect the ordinary garden hose to the hydrant or plug, Fig. 5 is a perspective view of a slightly modified form of hose shield such as is used with a coupling illustrated in Fig. 4, and Fig. 6 is a plan view of a blank from which the hose shield is formed, the same being illustrated upon a reduced scale.

Referring to the drawings, 1 indicates the end of the hose and 2 a hose coupling such as is ordinarily used to attach the hose to a pneumatic tool. The coupling comprises a nipple, 3 a sleeve, 4 adapted to be inserted in the end of the hose and a collar, 5, which is usually squared to receive a wrench. The shank or sleeve, 4 is serrated or transversely grooved as shown to hold more firmly within the hose.

The shield comprising my invention consists generally of a portion adapted to fit over the collar of the coupling and having an aperture for the nipple, 3, and a plurality of flexible members extending therefrom and adapted to inclose the end of the hose for a distance equal to or slightly greater than the length of the shank, 4. This may be formed in any suitable manner but I prefer to stamp the same out of sheet metal, and have so illustrated it in the several figures of the drawings.

Referring again to the drawings, 6 indicates a plate portion preferably formed of substantially the same shape and size as the collar, 5, and having a centrally disposed hole, 7 for the nipple, 3 to extend through. As the collar, 6 is usually hexagonal, I have illustrated the plate, 6 as being hexagonal to fit the same. Depending from each side of the member, 6 is a flexible tongue or member, 8 forming a series of plates, which completely surround the end of the hose. The members, 8 preferably extend slightly beyond the end of the sleeve, 4 and their ends are curved slightly inward as shown in Fig. 3. The device is first stamped out in the form shown in Fig. 6 and is then bent into the shape shown in Fig. 1.

In using the device it is slipped on the end of the hose over the coupling, the nipple, 3 extending through the hole, 7 and the plate portion, 6 forming a ring or collar to rest against the end face of the collar, 5. The usual wire clamp, 10 is then secured about the plates, or members, 8 binding them firmly upon the end of the hose. The plates, 8 prevent the wire 10 from cutting the hose, and also prevent expansion of the end of the hose; and the plate, 6 prevents the coupling from blowing or tearing loose from the hose, the friction of the plates, 8 against the hose and the biting of the curved ends, 9 into the walls, thereof being sufficient to prevent dislodgment of the shield.

It is obvious that a shield of the precise construction described can only be employed when the nipple is of less diameter than the collar, 5, hence, cannot be employed with such couplings as used for ordinary garden hose wherein the screw coupling member is of equal or greater diameter than the collar.

In Fig. 5 I have shown a slightly modified form of shield adapted for use with such a coupling and in Fig. 4 have illustrated it applied thereto. The only difference between this form of shield and the preceding is that I form the same of two or more similar parts so that it may be applied to the coupling by being placed laterally thereon instead of being slipped over the end as hereinbefore described.

The shield herein described is of simple construction and of low cost to manufacture and further may be used with any of the ordinary hose couplings to prevent them blowing out or tearing away from the hose.

Having described my invention what I claim as new and desire to secure by Letters Patent is:

A hose shield formed of sheet metal and comprising a plate portion adapted to fit in front of a collar of a hose coupling and having an aperture to receive the nipple thereof and a plurality of plate portions extending therefrom and adapted to inclose the end of the hose, and means for clamping said plates thereon, said plates having inwardly curved ends, substantially as and for the purpose specified.

In testimony whereof I have signed my name to this specification in the presence of two subscribing witnesses.

GEORGE E. BURTSCHER.

Witnesses:
LYDIA RINKENBERGER,
HELEN F. LILLIS.